United States Patent [19]

Colin et al.

[11] Patent Number: 4,993,778
[45] Date of Patent: Feb. 19, 1991

[54] REINFORCED FRAMEWORK FOR A VEHICLE SEAT

[75] Inventors: Pierre Colin, Mandeure; Francois Fourrey, Montbeliard, both of France

[73] Assignee: ECIA - Equipements et Composants Pour l'Industrie Automobile, Audincourt, France

[21] Appl. No.: 416,095

[22] Filed: Oct. 2, 1989

[30] Foreign Application Priority Data

Oct. 3, 1988 [FR] France ................... 88 12904

[51] Int. Cl.$^5$ ............................................. A47C 7/02
[52] U.S. Cl. ............................ 297/452; 297/449; 297/344
[58] Field of Search ............. 297/452, 460, 449, 445, 297/473, 475, 486, 344, 346, 329, 408

[56] References Cited

U.S. PATENT DOCUMENTS

| | | | |
|---|---|---|---|
| 1,710,911 | 4/1929 | Wittliff | 297/449 |
| 2,014,553 | 9/1935 | Browne | 297/344 X |
| 3,450,425 | 6/1969 | Leonhardt | 297/346 X |
| 3,711,153 | 1/1973 | Cunningham | 297/346 |
| 3,727,977 | 4/1973 | Gmeiner | 297/344 |
| 3,860,261 | 1/1975 | Takada | 297/475 |
| 4,470,632 | 9/1984 | Babbs | 297/346 X |
| 4,492,408 | 1/1985 | Lohr | 297/452 X |
| 4,585,273 | 4/1986 | Higgs et al. | 297/452 |
| 4,676,555 | 6/1987 | Tokugawa | 297/473 |

FOREIGN PATENT DOCUMENTS 879979 10/1961 United Kingdom ............. 297/452

Primary Examiner—Jose V. Chen
Attorney, Agent, or Firm—Sughrue, Mion, Zinn, Macpeak & Seas

[57] ABSTRACT

The framework comprises a cushion frame (1) provided on each side with a substantially triangular mount (34, 48) the mount (34) comprising a lower rear corner located at the rear of the cushion frame. The cushion frame is connected to a generally U-shaped backrest frame by a pivot shaft (4) which extends on one side through a port (14) of the backrest frame and on the other side through a triangular bracket (16) carrying three tubes (20,22,24) interconnected at their ends, on each side of the bracket, and connected to the bar (26) of the U-shape in the upper part of the tubes.

12 Claims, 3 Drawing Sheets

REINFORCED FRAMEWORK FOR A VEHICLE SEAT

BACKGROUND OF THE INVENTION

The present invention relates to a vehicle seat and more particularly a seat capable of carrying the anchorings of a safety belt and withstanding the forces applied to these anchorings.

Conventional safety belts, and in particular safety belts employed in automobiles, are anchored at three points: two lower anchorings and an upper anchorings.

The two lower anchorings are located on the floor of the vehicle or, in some cases, on the slideways for longitudinally adjusting the seat on each side of the seat cushion. The upper anchoring is most often fixed to the lateral post of the body. However, it is increasingly desired to fix this upper anchoring to the top of the backrest of the seat. This arrangement has indeed the advantage of allowing the belt to more completely fit around the body of the passenger and in this way limit the displacements of the body in the event of shocks from the front. Furthermore, in the case of lateral shocks, there is no longer any risk of the head of the passenger striking against the anchoring point located on the lateral post.

Now, the presence of an upper anchoring point at the top of the backrest of the seat subjects the latter to considerable forces. It is therefore necessary to reinforce the structure of the seat to guarantee its mechanical resistance in respect of a force exerted on the safety belt under the effect of a shock. Most of the existing arrangements employ a particularly massive structure to meet this need.

SUMMARY OF THE INVENTION

An object of the present invention is to provide a reinforced framework whereby it is possible to realize a seat structure which is capable of carrying the three anchoring devices of a safety belt while having a reasonable weight, and permits modifying the inclination of the backrest.

The invention therefore provides a vehicle seat framework comprising a closed cushion frame and a generally inverted U-shaped backrest frame which are interconnected by a pivot shaft, in which one of the upwardly extending sides of the backrest frame is formed by three bent tubes which are interconnected at their ends and connected to the bar of the U-shaped frame at their upper end and are secured between these ends to a triangular bracket through which the pivot shaft of the cushion and backrest extends.

According to another feature of the invention, the cushion frame comprises on each side a mount having at least one corner bearing against the floor, the mount close to the bracket having a lower corner located at the rear of the pivot shaft of the cushion and the backrest.

As the cushion frame and backrest frame may also be formed by tubes, the whole of the structure of the seat has only a reasonable weight. On the other hand, the presence on one of the sides of reinforcing tubes imparts sufficient rigidity to the seat to enable it to effectively resist the forces which might be exerted by a safety belt carried by a winder fixed to the top of the backrest.

The framework of the invention is more particularly adapted to the construction of automobile seats but may of course be employed for other seats whether they are vehicle or other seats.

The following description of an embodiment, given by way of non-limitative example and shown in the accompanying drawings, will bring out the advantages and features of the invention.

DETAILED DESCRIPTION OF THE PREFERRED EMBODIMENTS

Figure 1:
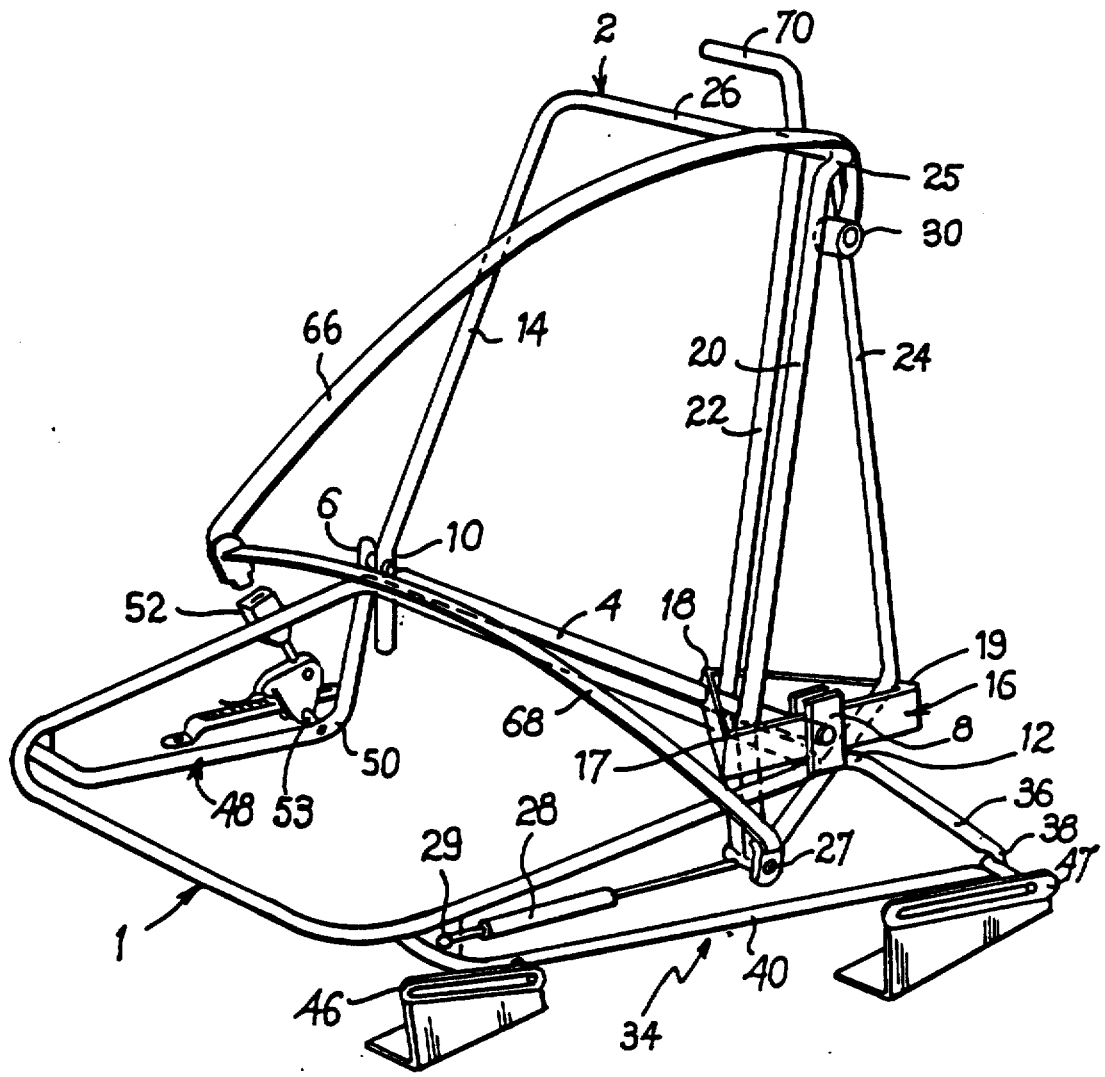
FIG. 1 is a perspective view of a seat framework according to the invention.
Figure 2:
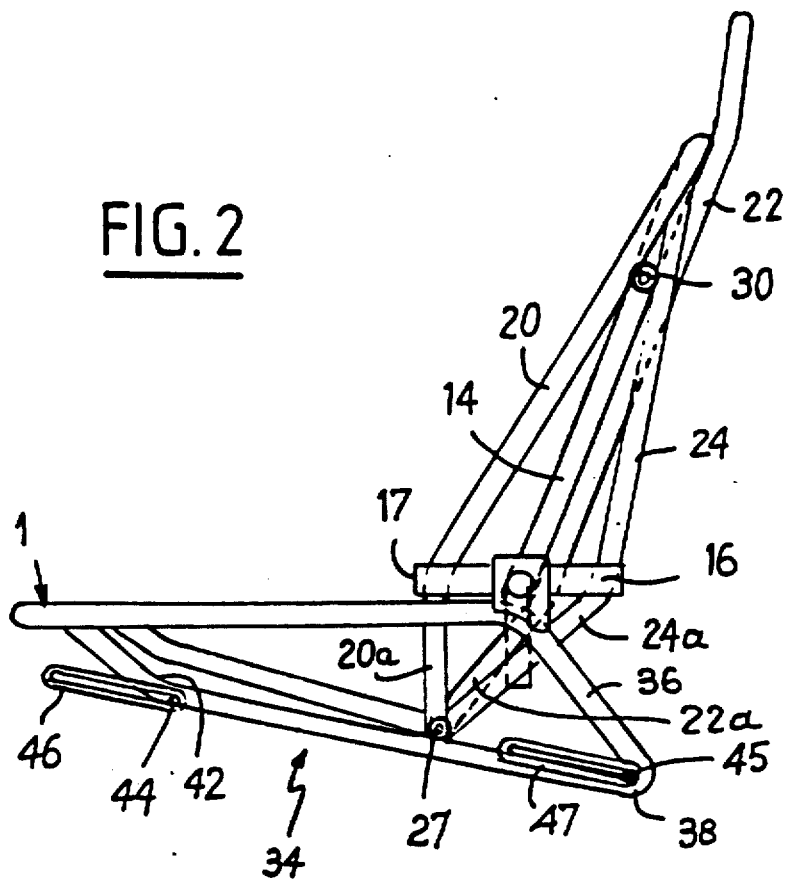
FIG. 2 is a side elevational view of the framework of FIG. 1.

The seat framework represented in FIGS. 1 and 2 comprises in the conventional way a cushion frame 1 which is closed onto itself and preferably constituted by a single tube, and a backrest frame 2 which has a generally inverted U shape and is connected to the cushion frame by a pivot shaft 4 whose end portions are carried by two yokes respectively 6 and 8 fixed to the frame 1 in the region of its rear corners 10 and 11. The pivot shaft 4 also extends on one side through the lateral post 14 of the backrest frame 2 and on the other side through a triangular bracket 16 fixed to the yoke 8.

Fixed in each of the corners 17, 18 and 19 of the bracket 16 is an upwardly inclined tube, respectively 20, 22 and 24. These tubes are interconnected in the vicinity of their upper end and form a pyramidal assembly. The tube 2 fixed in the front corner 17 of the bracket 16 is the extension of the post 14 and the upper bar 26 of the frame 2, and the two tubes 22 and 24 are fixed to this bar 26 in the vicinity of the bend 25 connecting it to the tube 20.

As shown in FIG. 1, the corner 17 is located in front of the pivot shaft 4 and the corner 19 is distinctly at the rear, while the corner 18 is very close to this shaft 4. In the embodiment shown in FIGS. 1 and 2, this corner 18 is in fact just behind the shaft 4, and the tube 22 fixed in this corner extends behind the pivot shaft of the backrest and cushion. The point at which it is fixed to the bracket 16 is however always in front of the bar 26 when the seat is in its position of use.

Figure 4:
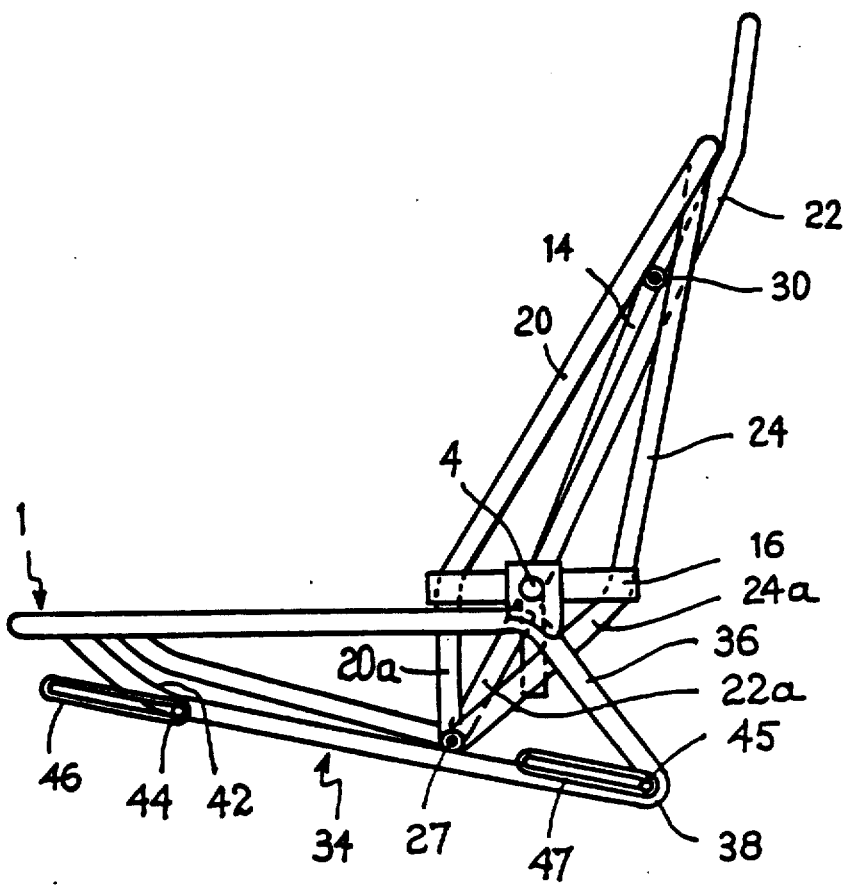
FIG. 4 is a view similar to FIG. 2 of a modification.

In a modification shown in FIG. 4, the tube 22 fixed in the corner 18 passes directly in the region of the shaft 4 which extends through the tube 22 and the post 14. The point at which it is fixed to the bracket 16 is, as is the yoke 6, in front of the bar 26.

The three tubes 20, 22 and 24 are bent in, the region of the bracket 16 and extended beyond the latter so as to constitute a second pyramid extending in the opposite direction to the first-mentioned pyramid. The extensions 20a, 22a and 24a are in this way united in their lower parts by a common member 27 which may easily support an anchoring member for a safety belt.

The member 27 may also be connected to a device 28 for adjusting the inclination of the backrest which, in urging this member forwardly or rearwardly, causes the bracket 16 and the assembly of the tubes 20, 22, 24 and 14 to pivot about the shaft 4. This device may be of any suitable electrical or mechanical type, such as a screw-and-nut system or, as shown, a jack acting between the member 27 and a member 29 secured to the front part of the cushion tube.

Further, a safety belt winder 30 may be mounted in the upper part of the backrest 2, substantially at the junction between the tubes 20, 22 and 24.

The horizontal shaft 4 extends through the bracket 16 in such manner that the tubes 20, 22 and 24 have the same freedom to pivot thereon as the opposed post 14.

Below the bracket 16, the frame 1 is connected to a mount 34 comprising a rear arm 36 which extends from the corner 12 and is downwardly and rearwardly inclined so that it forms, at its lower end at which it is connected to a forwardly an upwardly inclined arm 40, a bent portion 38 bearing against the floor and located sufficiently to the rear of the vertical plane through the pivot shaft 4 to increase the base size of the whole of the seat and in this way reduce the bearing reactions of the seat on the structure of the vehicle.

The arm 40 connects the bent portion 38 to the cushion frame 1 and forms in the vicinity of the latter a bent portion 42 which constitutes a second member for fixing to the floor of the vehicle. This bent portion may also be provided with shoes or rollers 44 adapted to cooperate with the fixed section member of a slideway 46 enabling the seat to be shifted longitudinally. In this case, like rollers or shoes 44 are mounted at the junction 38 between the arms 36 and 40 and cooperate with a slideway 47 provided for example with means for locking the rollers in the chosen position.

A second mount 48 is mounted on the other side of the frame 1. This mount is also formed by a bent tube. It is fixed at one end in the corner 10 of the frame 1 and, at its opposite end, in the vicinity of the front part of the latter. The bent portion 50 of this tube 48 constitutes a third bearing region on the floor which is located substantially at the rear three quarters of the cushion. Consequently the whole of the seat bears against the three corners of a triangle whose base is defined by the bent portions 42 and 38 located, one in front and the other distinctly at the rear, of the cushion of the seat, and is consequently substantially parallel to the outer side frame of the vehicle and in the vicinity of this side frame, while the corner opposite this base, constituted by the bent portion 50, is located in the central part of the vehicle.

It will be understood that the bent portion 50 may, as the bent portions 42 and 38, receive rollers or shoes which slide along a slideway section member. It may also carry the fastener of the locking buckle 52 of a safety belt.

Figure 3:
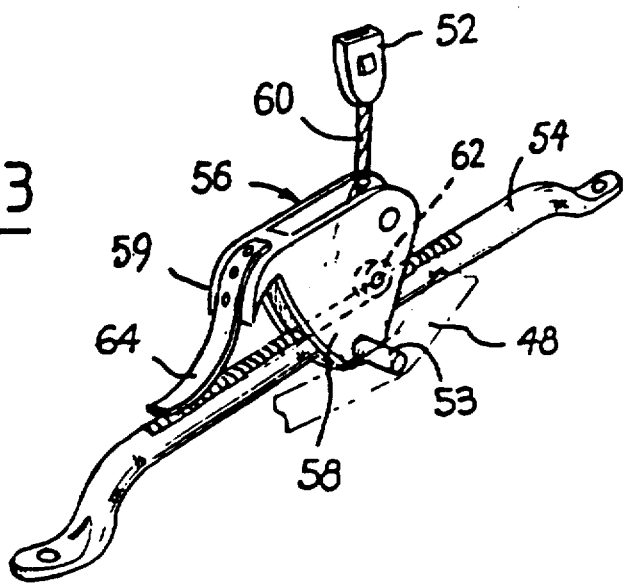
FIG. 3 is a perspective view to an enlarged scale of the attachment of the locking buckle of the belt on the seat framework of FIG. 1.

When the seat is adjustable longitudinally, the locking buckle 52 is preferably mounted on the bent portion 50 by means of a locking device which limits the effects of a large force exerted on the safety belt by imobilizing the bent portion 50. This locking device comprises for example (FIG. 3) a pin 53 which extends through the tube 48 and passes under a slideway 54 which is toothed in the manner of a rack and disposed on the floor of the vehicle parallel to the slideways 46 and 47. The pin 53 carries a pawl 56 which cooperates with the rack for the purpose of longitudinally locking the seat in position. This pawl is formed by a hollow member having two side walls 58 which are substantially triangular and come to fit on each side of the rack 54. The pin 53 extends through one of the corner portions of these two side walls, and the other two corner portions respectively carry a locking tooth 59 and the fastener 60 of the locking buckle 52 of the safety belt. A roller 62 is mounted between the two side walls 58 so as to roll along the slideway 54 upon a voluntary displacement of the mount 48, while a blade spring 64, fixed to the pawl 56 and bearing against the slideway 54, constantly biases the locking tooth 59 of the pawl away from the slideway and in this way allows this displacement. On the other hand, when a large force is exerted on the strap of the safety belt 66 fixed to the buckle 52 and to the winder 30, it causes a pivoting of the pawl 56 toward the notches of the rack 54 against the action of the spring 64 and immediately affords a locking by a jamming effect.

A safety belt 66, 68 mounted on the seat therefore has two lower anchoring regions, respectively constituted by the locking buckle 52 and the anchoring member 27, which are fixed to the cushion, and an upper anchoring region formed by the winder 30 mounted in the vicinity of the upper part of the backrest. This upper part is preferably slightly outwardly formed over so as to include a substantially horizontal bar 26 on the outer surface of which the strap 66 of the safety belt may slide when it issues from the winder 30.

The lateral reinforcement, constituted by the tubes 20, 22 and 24 and the mount 34 of the cushion, imparts to the seat structure great resistance and in particular enables it to resist the forces exerted by the belt 66 in the event of a front or lateral shock or impact. Indeed, the pyramid constituted by the bracket 16 and the three tubes 20, 22 and 24 is so oriented that, when a shock occurs, the oblique force exerted by the occupant on the cross strap 66 of the safety belt, under the effect of the deceleration, is substantially in alignment with the median plane of the pyramid passing through the rear tube 24. The tubes 20 and 22 are therefore under compression and the tube 24 under tension. The adjusting device 28, when provided, is subjected to an extension force.

Preferably, the bracket 16 has the shape of an isosceles triangle so that the median plane passing through the tube 24 is coincident with the plane of symmetry of the pyramid.

Further, the reinforcement of the backrest constitutes a shield which contributes to improving the safety of the passengers in the event of lateral shocks. This shield, in the same way as the reinforcement, is maintained identical irrespective of the position of the seat.

The reinforced framework constructed in this way is formed by tubes, which renders it particularly light and permits obtaining a seat structure which is considerably reinforced and offers great safety, while being of reasonable weight and low cost. Such a structure may moreover be easily adapted to very diverse types of vehicles which may be automobiles or other vehicles.

Furthermore, as shown in FIG. 1, the tube 22 fixed in the corner 18 may be easily upwardly extended beyond the bar 26 and bent so as to form a headrest support 70.

We claim:

1. A vehicle seat framework comprising:
   a cushion frame;
   a backrest frame having sides which extend upward relative to said cushion frame, and an upper bar which interconnect the upwardly extended sides;
   a triangular bracket; and
   a pivot shaft, extending through said triangular bracket, and interconnecting said cushion frame with lower portions of the sides of said backrest frame;
   one of the sides of said backrest frame comprising first, second and third tubes, an upper end portion of each of said tubes being connected to the upper bar of said backrest frame, a lower portion of each of said tubes being fixed to a respective corner of said triangular bracket, each of said tubes being bent at said triangular bracket so as to form bent end portions which extend below said triangular bracket, and ends of the bent end portions of said tubes being interconnected to each other.

2. The vehicle seat framework according to claim 1, wherein the other one of said sides of said backrest frame comprises a lateral post, and wherein said lateral post, said upper bar and one of said tubes are integrally connected.

3. The vehicle seat framework according to claim 1, wherein said cushion frame is closed onto itself and includes on each side thereof a mount having at least one corner for bearing on the floor of a vehicle, one of the mounts being disposed adjacent said triangular bracket and having a lower corner located at the rear of said backrest frame relative to said pivot shaft.

4. The vehicle seat framework according to claim 3, further comprising a safety belt anchoring member, and wherein one of the mounts is located on the side opposed to said triangular bracket and carries, in a region where it bears on the vehicle floor, said safety belt, anchoring member.

5. The vehicle seat framework according to claim 4, wherein said safety belt anchoring member comprises a locking buckle and a fastener which connects said locking buckle to said one mount.

6. The vehicle seat framework according to claim 1, further comprising two yokes each connected to said cushion frame, and wherein the other one of the sides of said backrest frame comprises a lateral post, said pivot shaft is carried by said two yokes, and wherein said pivot shaft extends through said triangular bracket and the lateral post of said backrest frame.

7. The vehicle seat framework according to claim 6, wherein said pivot shaft further extends through one of said tubes.

8. The vehicle seat framework according to claim 1, further comprising a safety belt anchoring member, a lower interconnection member, and a winder, wherein ends of the bent end portions of said tubes are interconnected at said lower interconnection member, said safety belt anchoring member is carried by said lower interconnection member, and wherein said winder is mounted in the vicinity of an upper junction region of said three tubes.

9. The vehicle seat framework according to claim 1, wherein said triangular bracket is pivotally mounted about said pivot shaft.

10. The vehicle seat framework according to claim 1, wherein said first and second tubes are fixed to said triangular bracket at locations which are spaced in front of, and spaced behind, said pivot shaft, respectively, and said third tube is fixed to said triangular at a location which is adjacent to said pivot shaft.

11. The vehicle seat framework according to claim 1, wherein said first and second tubes are fixed to said triangular bracket at locations which are in the front of the upper bar of said backrest frame when said backrest frame is disposed for a sitting position.

12. The vehicle seat framework according to claim 1, wherein one of said tubes extends beyond the upper bar of said backrest frame and is bent so as to form a headrest support.

* * * * *